United States Patent Office 3,330,871
Patented July 11, 1967

3,330,871
SAFE KETONE PEROXIDE COMPOSITIONS
Orville L. Mageli, Kenmore, and Solomon C. Westbrook, Jr., Buffalo, N.Y., assignors to Wallace & Tiernan Inc., Buffalo, N.Y., a corporation of New York
No Drawing. Filed Jan. 25, 1965, Ser. No. 427,968
10 Claims. (Cl. 260—610)

ABSTRACT OF THE DISCLOSURE

Peroxides of certain cyclic and acyclic ketones are made safe by solution in certain glycols and glycol ethers; some water and/or phthalate ester plasticizer and/or 2-pyrrolidone may be present. Example: MEK peroxides, 11% active oxygen; dimethyl phthalate, 30–40%; hexylene glycol, 10–20%; and water, less than 10%.

This invention relates to safe ketone peroxide compositions capable of safe handling, transportation, use, and storage.

This application is a continuation-in-part of our co-pending application Ser. No. 269,873, filed Apr. 2, 1963 now abandoned.

Ketone peroxides are valuable free radical polymerization catalysts but their preparation and use has been limited because of their extremely hazardous nature.

Lower alkyl ketones form peroxide structures which are extremely sensitive to impact and thermal shock. for example certain acetone peroxide and methyl ethyl ketone peroxide structures are known to explode violently on impact or on heating. Some cyclic ketones, cyclopentanone and cyclohexanone for example, behave like the lower alkyl ketones in their tendency to form hazardous peroxides.

Attempts have been made to reduce the hazardous nature of ketone peroxides, especially methyl ethyl ketone peroxides, by using a phthalate ester plasticizer in an amount at least about 30 percent by weight as a diluent or phlegmatizer for commercial products.

Despite efforts to overcome their hazard, commercial ketone peroxide compositions have been involved in numerous unexplained explosions.

A general object of this invention is a safe ketone peroxide composition suitable for use as a polymerization initiator.

It has been discovered that a composition consisting essentially of lower alkyl ketone peroxides, and an amount, sufficient to render the composition safe, of at least one compound, hereinafter designated Safety Solvent(s), selected from the class consisting of alkylene glycols, ethylene glycol mono alkyl ethers, diethylene glycol mono alkyl ethers, alkanols having 3 to 12 carbon atoms, cycloalkanols having 3 to 6 carbon atoms in the ring, cyclic ether substituted alcohols, and heterocyclic amides, is safe.

DEFINITION OF A SAFE FORMULATION

Test procedures recognized by the art as measures of the thermal stability and handleability of peroxides were used in determining the hazards of ketone peroxide compositions. Each test result is evaluated and the composite rating from all the tests is indicative of a formulation's safety.

The test procedures used were:

(1) *Pressure vessel test (PVT).*—The tester consisted of a cylindrical brass vessel (235 cc. volume) with a variable aperture disc in the side wall, closed at the top with a rupture disc. An aluminum rupture disc, crowned in shape, prestressed to 90% of its burst strength and rated at 98–100 p.s.i.g. is used There are 74 discs with the diameter of the bore varying in an exponential progression from 1 mm. to 24 mm.

On rapidly heating a material in the tester using a Meker burner, the rupture disc bursts or remains intact, depending on the force developed by the decomposition and amount of venting supplied by the size of the bore of the aperture disc used. The bore size of the disc needed to prevent disc rupture is a measure of the violence of decomposition and amount of gas developed.

It was experimentally determined that a 5.0 g. sample gave reproduceable results which could be used for comparative purposes. Benzoyl peroxide (98%) was chosen as a standard for the purpose of comparing organic peroxides in this test because it is a well known, widely tested, and commercially accepted material. It caused the rupture disc to burst at 14.9 mm. vent aperture.

(2) *Lead pipe deformation (LPD) test.*—The test involves the use of a #6 EB–10 blasting cap (Hercules Powder Co.) immersed in a 10-gram sample of peroxide in a test tube which fits snugly in a lead pipe of standard dimensions (0.75 inch I.D., 0.310 inch wall, 7.0 inch long). The lead pipe assembly is placed in a protective enclosure and the cap detonated from a safe distance. Data are recorded on the type of deformation and/or damage to the pipe.

(3) *Flash point (micro open cup).*—The National Fire Protection Association Tentative Standard on Basic Classification of Flammable and Combustible Liquids (N.F.P.A., No. 321–T—1964) was used as a basis for rating peroxides according to flash point.

(4) *Rate of ignition and burning.*—Two grams of sample are placed in an aluminum dish (12.5 mm. high by 44 mm. diameter). A ¾ inch flame from a small pilot burner is adjusted to impinge the liquid surface at about a 60 degree angle. The flame is removed on ignition of the sample.

The time to ignition, total burning time and type of burning are recorded.

(5) *Impact sensitivity.*—A sample of peroxide is subjected to the impact of a known weight dropping a measured distance on an impact testing apparatus. Sensitivity to impact or shock is determined by a report, smoke, or obvious decomposition of the sample.

A more complete description of the test procedures is reported by Noller and Bolton, Analytical Chemistry, 35, 887 (1963), and Noller et al., Ind. Eng. Chem., 56, #12, 18–27 (1964).

Safe ketone peroxide compositions have the following characteristics:

(1) Require a venting aperture of 10 mm. or less, and preferably less than 5 mm. when evaluated in the Pressure Vessel Test;

(2) Show a deformation of the lead pipe similar to or less than that shown by benzoyl peroxide (LPD Class III), and preferably similar to that shown by benzoyl peroxide (LPD Class III), and preferably similar to that shown by water (LPD Class IV) on the Lead Pipe Deformation Test;

(3) Exhibit a flash point greater than 140° F. and preferably greater than 200° F., if liquid;

(4) Exhibit a resistance to ignition by flame and once ignited burn mildly; and (5) Exhibit no sensitivity to shock on impact testing.

KETONE PEROXIDES

The ketone peroxides of the safe compositions of this invention, are commonly prepared by the reaction of the desired ketone with hydrogen peroxide, often in an acidic medium.

The state of the art of ketone peroxidation is shown by the works of Milas et al., Journal of the American Chemical Society, 61, 2430 (1939); 81, 3361 and 5824 (1959); U.S. Patent 2,298,405, U.S. Patent 3,003,000; Bjorklund et al., Trans. Roy. Soc. Can., 44, Sec. 3, 25–30 (1950); Stoll et al., Helv. Chem. Acta, 13, 142 (1930); Criegee et al., Ann., 565, 7–21 (1949); and Halbig, U.S. Patent 2,750,421.

The term acylic or alicyclic ketone peroxide as used herein, includes the entire family of possible structures derived from acyclic or alicyclic ketones as described in the referenced art.

It is to be appreciated that the formulations of this invention will avoid the presence of significant amounts of hydrogen peroxide in the final peroxidation product. Small amounts may be present as a result of an incomplete reaction or by means of the dissociation of the various possible peroxidic structures.

It is to be understood, however, that the formulations of the invention comprehend the presence of one or more of the various possible peroxidic structures and mixtures thereof known to the art, produced during the peroxidation of ketones.

Suitable ketones are: acyclic ketones, commonly containing 3 to 6 carbon atoms, said ketones including those having straight and branched carbon chains; and alicyclic ketone, having a carbon atom ring nucleus, commonly 3 to 6 carbon atoms, said ring may be substituted with an aliphatic, cycloaliphatic, or aromatic group.

Illustrative ketones are: dimethyl ketone, diethyl ketone, methyl ethyl ketone (MEK), methyl propyl ketone, methyl isobutyl ketone, cyclopentanone, cyclohexanone, methyl cyclohexanones, 3-methylcyclopentene-2-one, mesityl oxide, isophorone.

Especially preferred ketones are: dimethyl ketone, diethyl ketone, methyl ethyl ketone (MEK), and cyclohexanone.

Recent work, following the chromatographic techniques reported by Milas et al., J. Am. Chem. Soc., 81, 3358 and 5824 (1959), has shown that commercial MEK peroxide compositions are complex mixtures of peroxides. No published method currently is available to accurately determine the percentage of each peroxidic component present in such a mixture. However, industrial usage has led to the acceptance of 11% Active Oxygen (A(O)) content as corresponding to 60% MEK peroxide content. In describing this invention, instead of attempting to compute the "actual compound percentage" of peroxidic component in a composition, the percent Active Oxygen (A(O)) content will be used to denote the peroxidic component content of the composition.

SAFETY SOLVENT

The safety solvent must possess a solvating ability for the peroxidation reaction products, must not have a deleterious action on the catalytic activity or ordinary stability (shelf-life) of the peroxide, and at the same time must act as a desensitizer toward thermal shock and impact sensitivity. It is also preferable that the solvent have a relatively high flash point.

Suitable safety solvents include alkylene glycols, ethylene glycol monoalkyl ethers, diethylene glycol monoakyl ethers, akanols having 3 to 12 carbon atoms, cycloalkanols having 3 to 6 carbon atoms in the ring, cyclic ether substituted alcohols, and heterocyclic amides.

Illustrative examples are: n-butyl alcohol, capryl alcohol, octyl alcohol, dodecyl alcohol, tetrahydrofurfuryl alcohol, benzyl alcohol, 1,4 - cyclohexane dimethanol, cyclohexanol, glycerol, ethylene glycol, polyethylene glycols (molecular weights under 20,000), propylene glycol, di-propylene glycol, neopentyl glycol, hexylene glycol, 1,4-butylene glycol, 2,3-butylene glycol, butene diol, 1,5-pentane diol, 3,6-dimethyloxtane-3,6-diol, 2,5-dimethyl-hex-3-yne-2,5-diol, 2,4,7,9-tetramethyldecane-4,7-diol, 2,2,4,4-tetramethyl-1,3-cyclobutanediol, ethylene glycol monoethyl ether (Cellosolve), butyl Cellosolve, diethylene glycol monoethyl ether (Carbitol), butyl Carbitol, 2-pyrrolidone, N-methyl-2-pyrrolidone.

Preferred safety solvents are: ethylene glycol, propylene glycol, neopentyl glycol, hexylene glycol, 2,3-butylene glycol, 1,4-butylene glycol, tetrahydrofurfuryl alcohol, 2-octanol, octyl alcohol, dodecyl alcohol, cyclohexanol, ethylene glycol monoethyl ether (Cellosolve), diethylene glycol monoethyl ether (Carbitol), butyl Carbitol, 2-pyrrolidone, N-methyl-2-pyrrolidone.

The safe acyclic ketone peroxide compositions of this invention, contain, in weight percent composition, an amount of Safety Solvent(s), generally about 5% to 90%, commonly about 8% to 50%, and preferably about 10% to 30%.

The safe alicyclic ketone peroxide compositions of this invention generally contain, in weight percent of composition, from about 10% to 25% of Safety Solvent(s).

WATER

Water alone does not act as a safety solvent in regard to the Pressure Vessel Test. In fact, high water content ketone peroxide compositions may be unsafe unless, the proper amount of safety solvent is present.

It has been found that water has a beneficial effect on certain of the characteristics of a composition. Commonly at least about 3% by weight water is desirable in a safe composition derived from acylic ketones. An increase in water content will, in general, provide a composition with increased resistance to ignition by flame. It is pointed out that the peroxidation of an acyclic ketone with hydrogen peroxide normally takes place in an aqueous medium and it is difficult therefore to obtain a product which does not contain water.

The type of ketone peroxide and the solvent components of a composition will determine the amount of water tolerable. Also the end use, e.g., as a polymerization initiator will determine the amount of water allowable in the composition. On the other hand, some applications do not tolerate the presence of any significant amounts of water.

The safe acyclic ketone peroxide compositions of this invention generally contain in weight percent of composition, about 0% to 30% water, more commonly about 3% to 20% water, and preferably about 4% to 16% water.

Alicyclic ketone peroxides, usually are crystalline solids, and the product as prepared generally does not contain any significant amount of water.

The safe alicyclic ketone peroxide compositions commonly do not contain any significant amount of water. However, safe alicyclic ketone peroxide compositions which contain hydrophilic Safety Solvent(s), commonly may contain up to about 10% by weight of water.

PHTHALATE ESTER DILUENTS

Ketone peroxide compositions have in the past been prepared using various phthalate esters as diluents. This was done to provide what was once considered a safe commercial product.

The safety tests listed herein demonstrate that a commercial MEK peroxide-phthalate ester composition containing about 11% active oxygen, is not safe.

However, it has been discovered that the addition of safety solvents to compositions containing phthalate ester plasticizers can make them safe.

Illustrative phthalate esters are: dimethyl phthalate (DMP), dibutyl phthalate (DBP), dioctyl phthalate (DOP), dibenzyl phthalate, butyl benzyl phthalate (BBP), diallyl phthalate (DAP).

Those preferred are: dimethyl phthalate, dibutyl phthalate, and diallyl phthalate.

Commonly commercial acylic ketone peroxide-DMP compositions have about 11% A(O) and contain 30% to 40% of dimethyl phthalate, preferably about 35% to 40%.

Alicyclic ketone peroxide compositions generally contain, in weight percent of composition, from about 0% to 50% phthalate ester. The type of composition desired, granular or crystalline, solid or paste, governs the amount of phthalate ester present. Commercial paste compositions of cyclohexanone peroxide commonly contain about 50% phthalate ester, while granular solid compositions commonly contain about 10% to 15%.

COMPOSITIONS OF THE INVENTION

The safe compositions of this invention contain an amount of the aforementioned Safety Solvent(s) to at least render the compositions safe, commonly about 5% to 90%. The amount necessary to insure safety varies with the particular ketone peroxide composition and with the type and amount of other diluent which may be present.

Generally MEK peroxide-DMP compositions, having about 11% active oxygen content, require from about 5% to 25% Safety Solvent(s), with from about 10% to 20% commonly used. The higher the active oxygen content of a composition, the greater percentage of Safety Solvent(s) required.

In compositions which do not contain DMP or other phthalate esters, the active oxygen concentration and the amount of water present determine the amount of Safety Solvent(s) required for a safe product.

Generally the aqueous MEK peroxide compositions of the type hereinafter described (Examples 1 to 6), require an amount of Safety Solvent(s) sufficient to reduce the active oxygen content of the formulation to less than about 13.5% to 14.5% assuming complete loss of the water content.

The invention is particularly directed to safe acylic mono ketone peroxide compositions, especially those derived from dimethyl ketone, diethyl ketone, and methyl ethyl ketone.

Safe compositions will contain in weight percent of composition:

(a) Acyclic mono ketone peroxide sufficient to afford, generally about 0.9% to 12.5% active oxygen content, more commonly about 9.0% to 12.5% active oxygen content, preferably about 11% active oxygen content;

(b) Water, generally 0% to 30%, commonly about 3% to 20%, preferably 4% to 16%;

(c) Phthalate ester, generally 0% to 40%, more commonly about 30% to 40%, preferably about 35% to 40%; and (d) Safety Solvent(s), generally about 5% to 90%; commonly 8% to 50%, preferably 10% to 30%.

The peroxidation of the ketone can be effected, in accordance with the present invention, either in the presence of a hydrophilic solvent or in the usual manner and the aqueous ketone peroxide then taken up in a desired hydrophilic solvent. The peroxidation reaction is terminated by raising the pH to above about pH 4.5 and below pH 7, above which an adverse effect is produced. This permits, therefore, the reaction of ketone and hydrogen peroxide at low temperatures and at relatively low pH with termination of the peroxidation at the level of highest water miscible component content; that is, where the monomeric peroxide content is at the desired high level and where the higher polymeric units have formed to the desired high component, even to the tetramer and higher, and in wanted amount.

The pH of the reaction environment is preferably raised by the addition to the reaction mixture of an amide, such as 2-pyrrolidone, N-methyl-2-pyrrolidone or N,N dimethyl formamide, preferably the N-methyl-2-pyrrolidone, all of which are hydrophilic solvents and may be thought of as organic bases whereby to raise the pH of the reaction environment.

The extent of the reaction between the ketone and the hydrogen peroxide is governed by the amount and type of solvent used as the reaction media and the continued low pH in the liquid reaction environment.

Thus, to provide a product that contains predominantly the peroxide monomer component, the reaction between the ketone and aqueous hydrogen peroxide is preferably performed in the presence of a heterocyclic substituted amide. Operable amides are 2-pyrrolidone, N-methyl-2-pyrrolidone or N,N dimethyl formamide.

Safe relatively stable aqueous compositions of acyclic mono ketone peroxides, especially those derived from dimethyl ketone, diethyl ketone, and methyl ethyl ketone, generally have a pH of greater than 4.5 and less than pH 7 and contain in weight percent composition:

(a) Acyclic mono ketone peroxide, sufficient to afford an active oxygen content, commonly about 7.25% to 12.5%, preferably 7.25% to 11%.

(b) Heterocyclic amide, commonly about 4% to 20%, preferably 4% to 10%;

(c) Safety Solvent(s), commonly about 5% to 40%, preferably 18% to 24%; and (d) Water, commonly about 5% to 30%, preferably 10% to 25%.

PREPARATION AND TESTING OF ACYCLIC KETONE PEROXIDE COMPOSITIONS

Example 1

A sample of methyl ethyl ketone peroxide solution was prepared by employing 34.6 grams methyl ethyl ketone, 38.4 grams hydrogen peroxide (60%) and 21 grams hexylene glycol, in the presence of a sulfonic acid type cation exchange resin sold on the market as Dowex 50W-X8. The methyl ethyl ketone and resin were placed in the reaction flask, carried in a cooling bath, and then hydrogen peroxide was added dropwise with stirring, at 0° C.±5° C. over a period of 10 minutes. The mixture was then stirred for an additional 2 hours to complete the reaction. The resin was separated from the reaction mixture when chromatographic examination showed substantially a single component, and 6 grams of N-methyl-2-pyrrolidone added. The resultant product possessed an active oxygen content of 10.70% by weight, as determined by the usual iodidethiosulfate titration.

The approximate composition was:

| | Percent |
|---|---|
| Methyl ethyl ketone peroxides, A(O) | 10.7 |
| Hexylene glycol | 21 |
| N-methyl-2-pyrrolidone | 6 |
| Water | 15 |

Samples of this product were stored in glass at 50° C. and the active oxygen content determined after 5 days. The active oxygen content in percent by weight was found to be 10.65 (original 10.70%), thereby demonstrating the thermal stability of this product.

Example 2

Methyl ethyl ketone (180 g.), hexylene glycol (144 g.) and 50 g. Dowex 50W-X8 ion exchange resin were placed in a reaction flask equipped with stirrer, thermometer and provided with external cooling. Hydrogen peroxide (213 g. of 60% aqueous) was added slowly with stirring at 0° C. to 2° C. over a period of 10 minutes. Additional stirring for 30 minutes produced a 4-component product, as determined by paper chromatography. The reaction product possessed an active oxygen content of 10.44%.

The approximate composition was:

| | Percent |
|---|---|
| Methyl ethyl ketone peroxides, A(O) | 10.44 |
| Water | 16 |
| Hexylene glycol | 26 |

Samples of this product stored in glass at 40° C. and 50° C. respectively, after 5 days, possessed an active oxygen content of 10.26% and 10.10%, respectively (original 10.44%).

Example 3

To demonstrate the added stability of the product obtained when using a heterocyclic substituted amide as a part of the solvent, a slightly different modification was used. Methyl ethyl ketone, 180 grams, and 77 grams hexylene glycol were placed in a cooled reaction vessel, and 213 grams of 60% hydrogen peroxide added dropwise, maintaining the temperature of the reaction mixture at 0° C.±5° C. After about two hours, the reaction was completed, at which time 77 grams of N-methyl-2-pyrrolidone was added. This produced a solution having an active oxygen content of 10.49% and a mixture having the following approximate composition:

| | Percent |
|---|---|
| Methyl ethyl ketone peroxides, A(O) | 10.49 |
| Water | 16 |
| Hexylene glycol | 13 |
| N-methyl-2-pyrrolidone | 13 |

Samples of this product, after storage for 5 days at 40° C. and 50° C., respectively, in glass, showed an active oxygen content of 10.45% and 10.39%, respectively (original 10.49%).

The preceding examples are all illustrative of safe formulations as rated by the aforesaid safety test procedures. Test results are set out in Table I.

TABLE I

| Test | Composition of Example No. | | |
|---|---|---|---|
| | 1 | 2 | 3 |
| Pressure Vessel: Vent aperture at bursting of rupture disc, mm | 1.5 | <1.0 | <1.0 |
| LPD Class | IV | IV | IV |
| Flash Point, ° F. (Micro Open Cup) | 150 | 170 | 160 |
| Rate of Ignition and Burning: | | | |
| Time to Ignition, secs | 110 | 70 | 180 |
| Total Burning Time, secs | 200 | 150 | 200 |
| Impact Sensitivity | (¹) | (¹) | (¹) |

¹ Not sensitive.

Example 4

In a modification to prepare a product containing two components, 216 grams methyl ethyl ketone, 100 g. N-methyl-2-pyrrolidone and 50 grams of a sulfonic acid type cation exchange resin in its acid form (Dowex 50W-X8) were placed in a reaction vessel. Hydrogen peroxide, 204 g. of 50% aqueous, was added dropwise with stirring, maintaining the temperature at 0° C.±5° C. After an additional stirring period, the ion exchange resin was removed. The resultant product had an active oxygen content of 8.98%, showing only two spots on the paper chromatogram and indicating 85% dihydroperoxy monomer and 15% dimeric peroxide.

The approximate composition was:

| | Percent |
|---|---|
| Methyl ethyl ketone peroxides, A(O) | 8.98 |
| N-methyl-2-pyrrolidone | 20 |
| Water | 30 |

The product of this example remained clear and homogeneous when stored at temperatures from −10° C. to +50° C. The number of components remained at 2 from −10° C. to 30° C. but increased to 4 at 50° C. after 30 days at that temperature.

It has been found that the safety characteristics of the formulations of the aforesaid examples may be further improved by an additional processing step involving the removal of volatile constituents.

In practice the ketone peroxide formulations are freed of a major proportion of the volatiles in an amount totaling about 10 to 15 percent by weight of the formulation.

The amount of volatile material removed is replaced by a corresponding amount of the desired safety solvent in order to maintain the original peroxide concentration and catalytic activity.

Example 5

In a modification to produce an even safer product, the composition of Example 1 was freed of volatiles, with hexylene glycol, about 10% by weight, added as the additional safety solvent to maintain the active oxygen concentration at the desired level of about 11%.

Example 6

The composition of Example 4 was also freed of volatiles, with N-methyl-2-pyrrolidone, 10% by weight, added as the additional safety solvent to maintain about 9% A(O) content in the composition.

The safety characteristics as determined denoted safe products.

TABLE II

| Test | Composition of Example No. | |
|---|---|---|
| | 5 | 6 |
| Pressure Vessel: Vent aperture at bursting of rupture disc, mm | <1.0 | <1.0 |
| LPD Class | IV | IV |
| Flash Point, ° F. (Micro Open Cup) | 210 | 200 |
| Rate of Ignition and Burning: | | |
| Time to Ignition, secs | 180 | 530 |
| Total Burning Time, secs | 230 | 580 |
| Impact Sensitivity | (¹) | (¹) |

¹ Not sensitive.

PREPARATION AND TESTING OF FORMULATIONS CONTAINING DIMETHYL PHTHALATE

As hereinbefore stated prior commercial MEK peroxide compositions containing dimethyl phthalate as the diluent and having about 11% active oxygen content are not safe.

In general these compositions, cause the bursting of the rupture disc even at the maximum venting aperture of 24 mm. on the Pressure Vessel Test; show a LPD rating of at least Class III (similar to Benzoyl Peroxide), generally Class II–III, often Class II (similar to ammonium nitrate); and ignite readily and burn with vigor. Impact sensitivity is exhibited by some compositions.

Example 7

Methyl ethyl ketone (MEK) (340 grams) and dimethyl phthalate (DMP) (250 grams) were placed in a reaction flask equipped with a stirrer and thermometer and cooled to about −5° C.

Hydrogen peroxide (465 grams of 50% aqueous) and sulfuric acid (40 grams of 60% Be) were carefully mixed at 10–15° C. The acidified hydrogen peroxide was then added slowly with stirring maintaining the temperature of the reaction at 0° C. ±5° C. After addition was complete stirring was continued for an additional 30–60 minutes.

After settling, the aqueous phase was separated and the organic phase washed until substantially neutral.

The wet product was then dried with 50 grams magnesium sulfate (dried powder) and after filtering about 680 grams of a MEK peroxide-DMP composition having approximately 11% active oxygen content was obtained. This formulation was not safe (see Table III).

Example 8

In a modification to prepare a safe MEK peroxide-DMP composition, the product of Example 7 (wet) was subjected to an additional processing step.

An amount of safety solvent sufficient to replace the volatile materials removed, generally 10% to 15% by weight, was added to the wet product of Example 7, and a volume of volatile materials, calculated to be 12–14% of the total weight of the wet product was then removed. The product obtained had an active oxygen content of about 11% and was safe by all the test procedures hereinbefore described.

In a composition in which hexylene glycol, about 10% by weight, was added as the safety solvent, a safe product was obtained (see Example 8, Table III).

A safe product exhibiting similar safety characteristics as Example 8 was obtained when the dry product of Example 7 was treated in the same manner as the wet, with approximately 10% hexylene glycol added as the safety solvent.

TABLE III

| Test | Composition of Example No. | |
|---|---|---|
| | 7 | 8 |
| Pressure Vessel: Vent aperture at bursting of rupture disc, m | [1] 24 | 3.0–4.0 |
| LPD Class | II–III | III–IV |
| Flash Point, °F. (Micro Open Cup) | 125–135 | 220 |
| Rate of Ignition and Burning: | | |
| Time to Ignition, secs | 10 | 65–75 |
| Total Burning Time, secs | 35 | 75–85 |
| Impact Sensitivity | [2] | [2] |

[1] Violently.
[2] Not sensitive.

Example 8A

Additional compositions were prepared to test other solvents as safety solvents by following the procedure of Example 8 with the exception the safety solvent was not added prior to the removal of volatiles. The product obtained assayed about 12.5% A(O) and to this, was added sufficient of the solvent to be checked to reduce the active oxygen content to about 11%. The resulting composition was found to be safe on the addition of at least one of the following solvents:

Ethylene glycol; propylene glycol; neopentyl glycol; 2,3-butylene glycol; 1,4-butylene glycol; dipropylene glycol; polyethylene glycols (molecular weights 200 to 20,000); 2,5-dimethyhex-3-yne-2,5-diol; 2,4,7,9-tetramethyldecane - 4,7 - diol; 2,2,4,4-tetramethyl-1,3-cyclobutane diol; n-butyl alcohol; octyl alcohol; 2-octanol; dodecyl alcohol; tetrahydrofurfuryl alcohols; benzyl alcohol; butane diol; Cellosolve; Carbitol; butyl Carbitol; cyclohexanol; 2-pyrrolidone; N-methyl-2-pyrrolidone.

The DMP containing safe compositions of Example 8A of this invention generally cause the bursting of the rupture disc at less than 10 mm. venting aperture, commonly at from less than 1 to 5 mm.; exhibit a LPD rating of at least Class III–IV, commonly Class IV (similar to water); commonly have flash points greater than 200° F.; and resist ignition by flame to a greater degree than does Example 7.

Despite the well known hazardous nature of peroxides from dimethyl ketone (acetone) and diethyl ketone, safe compositions are possible, following the teachings of this invention.

Example 9

A safe dimethyl ketone peroxide of the approximate composition:

| | Percent |
|---|---|
| Dimethyl ketone peroxides, A(O) | 11 |
| Hexylene glycol | 13 |
| N-methyl-2-pyrrolidone | 13 |
| Water | 24 | was obtained by the process set out in Example 3.

Example 10

A safe composition was prepared using, the process of Example 3 to peroxidize diethyl ketone; the approximate composition was:

| | Percent |
|---|---|
| Diethyl ketone peroxides, A(O) | 11 |
| Water | 14 |
| Hexylene glycol | 13 |
| N-methyl-2-pyrrolidone | 13 |

Test results are set out in Table IV.

TABLE IV

| Test | Composition of Example No. | |
|---|---|---|
| | 9 | 10 |
| Pressure Vessel Test: Vent aperture at bursting of rupture disc, mm | 1.0 | <1.0 |
| Flash Point, °F. (Micro Open Cup) | 215 | 150 |
| Rate of Ignition and Burning: | | |
| Time to Ignition, secs | 350 | 75 |
| Total Burning Time, secs | 375 | 165 |
| Impact Sensitivity | [1] | [1] |

[1] Not sensitive.

Example 11

To show the effect of the water content of a MEK peroxide composition on its resistance to ignition by flame, a series of compositions with varying water content were prepared.

A high A(O) assay intermediate composition was prepared, by stripping off volatiles and water from a composition prepared in the manner of Example 1. The addition of the proper amounts of hexylene glycol and water resulted in the following safe formulations. Results are set out in Table V.

TABLE V

| | Composition of Example No. | | | | |
|---|---|---|---|---|---|
| | 11A | 11B | 11C | 11D | 11E |
| Approximate Composition: | | | | | |
| MEK Peroxide Active Oxygen Content, percent | 9.0 | 9.0 | 9.0 | 9.0 | 9.0 |
| Hexylene glycol, percent | 20 | 28 | 34 | 37 | 39 |
| N-methyl-2-pyrrolidone, percent | 10 | 10 | 10 | 10 | 10 |
| Water, percent | 20 | 12 | 6 | 3 | 1 |
| Safety Tests: | | | | | |
| Pressure Vessel: Vent aperture at bursting of rupture disc | 1.0 | <1.0 | <1.0 | <1.0 | <1.0 |
| Flash Point, °F | 200 | 210 | 220 | 225 | 230 |
| Rate of Ignitio₁ and Burning: | | | | | |
| Time to Ignition, secs | 340 | 180 | 110 | 65 | 40 |
| Total Burning Time, secs | 360 | 225 | 155 | 120 | 105 |
| Impact Sensitivity | All not sensitive | | | | |

PREPARATION AND TESTING OF ALICYCLIC KETONE PEROXIDE COMPOSITIONS

It is well known that the peroxidation of alicyclic ketones with hydrogen peroxide, like that of acyclic ketones leads to the formation of a number of peroxidic structures depending upon the reaction medium and conditions.

Generally the peroxides formed from cyclopentanone, cyclohexanone and methyl cyclohexanones are crystalline solids, and are sensitive to shock, friction, and rapid heating: Milas, J. Am. Chem. Soc., 61, 2430 (1939), U.S. Patent 2,298,405, Bjorklund, Trans. Roy. Soc. Can., 44, Sec. 3, 27 (1950), and Halbig, U.S. Patent 2,750,421.

It has been discovered that the use of the safety solvents of this invention results in safe compositions of ketone peroxides derived from alicyclic ketones, especially the hydroperoxy peroxides. The use of the same amount of phthalate esters did not provide the same safe product.

Example 12

1,1'-bis-hydroperoxy-dicyclohexylperoxide was prepared according to the method of Criegee as reported in the Annalen der Chemie 565, 17 (1949). A white crystalline solid with an active oxygen content of 17.92% was obtained (calculated 18.25% A(O)).

This product was shock sensitive at 1½" drop height, and 2 grams caused the bursting of the rupture disc at 11 mm. vent aperture in the Pressure Vessel Test. The product ignites immediately and burns violently.

Dimethyl phthalate, 10% by weight, was admixed with the product of Example 12 and the resulting composition tested. This sample caused the bursting of the rupture disc at 10.5 mm. in the Pressure Vessel Test.

The product of Example 12 was admixed with 10% by weight of a safety solvent and the resulting composition tested. When hexylene glycol, Carbitol, dodecyl alcohol, tetrahydrofurfuryl alcohol, or N-methyl - 2 - pyrrolidone were added individually as the safety solvent, the Pressure Vessel Test results indicated a safe product. These formulations caused the bursting of the rupture disc at from about 5 mm. to 7.5 mm. vent aperture. The burning rate was also modified.

The product of Example 12 was admixed with 10% by weight of hexylene glycol and 5% by weight of water and this composition was found to be safe according to the Pressure Vessel Test results. The vent aperture at bursting of the rupture disc was <5 mm.

The product of Example 12 was admixed with 25% by weight of hexylene glycol and this composition was found to be safe according to the Pressure Vessel Test results. The vent aperture at the bursting of the rupture disc was <5 mm.

In the Pressure Vessel Tests the amount of the 1,1-bishydroperoxy dicyclohexylperoxide was kept equal to 2 grams, by adjusting the sample weight of the composition being tested, so that the results would be comparable.

It has been discovered that the thermal stability of a particular safe composition can be vastly improved by having present a reaction product of ethylene oxide and an alkyl phenol; for example, nonyl phenyl ether of polyethylene glycol (10–11 ethylene oxide units).

The safe composition of improved thermal stability will contain, in weight percent of composition:

(a) Acyclic ketone peroxide, sufficient to afford an active oxygen content, commonly about 7.25% to 12.5%, preferably about 7.25% to 11%;

(b) Heterocyclic amide, commonly about 4% to 20%, preferably about 4% to 10%;

(c) Safety Solvent(s), commonly about 5% to 40%, preferably about 10% to 24%;

(d) Water, commonly about 5% to 30%, preferably about 8% to 20%; and (e) Nonyl phenyl ether of polyethylene glycol, commonly about 5 to 40%, preferably about 10% to 20%.

To illustrate the improved thermal stability of this safe composition, a product, having the following approximate composition:

| | Percent |
|---|---|
| Methyl ethyl ketone peroxides, A(O) | 11.24 |
| N-methyl-2-pyrrolidone | 10 |
| Hexylene glycol | 22 |
| Nonyl phenyl ether of polyethylene glycol | 10 |
| Water | 8 | was tested for a period of 48 hours in a 75° C. water bath, and the active oxygen content was only lowered to 10.73%.

Under the same test conditions, a product of a similar composition, except that water replaced the 10% of nonyl phenyl ether of polyethylene glycol, dropped in active oxygen content from about 11% to 1.1%.

Another product, having the following approximate composition:

| | Percent |
|---|---|
| Methyl ethyl ketone peroxides, A(O) | 11.5 |
| N-methyl-2-pyrrolidone | 8 |
| Hexylene glycol | 10 |
| Nonyl phenyl ether of polyethylene glycol | 20 |
| Water | 12 | was tested for a period of 30 days at 50° C. and the active oxygen content was only lowered to 11.1%. In the same test, a composition, of the following approximate composition:

| | Percent |
|---|---|
| Methyl ethyl ketone peroxides, A(O) | 11.0 |
| N-methyl-2-pyrrolidone | 6 |
| Hexylene glycol | 20 |
| Water | 22 | dropped in active oxygen content to 5.8%.

Similar results were obtained with safe MEK peroxide compositions in which the nonyl phenyl ether of polyethylene glycol content was varied within the aforementioned limits.

While numerous safe compositions and embodiments of the invention have been set forth, it is to be understood the invention is not limited thereto and is limited only by the aforesaid description.

Thus having described the invention, what is claimed is:

1. A safe acyclic ketone peroxide composition consisting essentially of, in weight percent of composition:

(a) ketone peroxides derived from unsubstituted acyclic ketones having 3 to 6 carbon atoms, sufficient to afford about 0.9% to 12.5% active oxygen content of said composition;

(b) not more than about 30% of water;

(c) not more than about 40% of phthalate ester plasticizer;

(d) about 5% to 90% of at least one member selected from the group consisting of alkylene glycols, ethylene glycol monoalkyl ethers, diethylene glycol monoalkyl ethers, and cyclic ether substituted alcohols, and (e) not more than about 50% of an amide selected from the class consisting of 2-pyrrolidone and N-methyl-2-pyrrolidone.

2. Composition of claim 1 wherein said alkylene glycol is hexylene glycol.

3. Composition of claim 1 wherein said alkylene glycol is propylene glycol.

4. Composition of claim 1 wherein said amide is N-methyl-2-pyrrolidone.

5. Composition of claim 1 wherein said ketone peroxide is derived from methyl ethyl ketone.

6. A safe methyl ethyl ketone peroxide composition consisting essentially of, in weight percent of composition:

(a) methyl ethyl ketone peroxides, sufficient to afford about 9.0% to 12.5% active oxygen content of said composition;

(b) dimethyl phthalate, not more than about 40%;

(c) water, not more than about 20%; and (d) about 8 to 50% of at least one member selected from the group consisting of ethylene glycol, propylene glycol, neopentyl glycol, hexylene glycol, 2,3-butylene glycol, 1,4-butylene glycol, tetrahydrofurfuryl alcohol, ethylene glycol monoethyl ether, diethylene glycol monoethyl ether, and polyethylene glycols with molecular weights of not more than about 20,000, and (e) about 8 to 50% of N-methyl-2-pyrrolidone.

7. A safe methyl ethyl ketone peroxide composition consisting of, in weight percent of composition:

methyl ethyl ketone peroxides, sufficient to afford about 11% active oxygen content of said composition;

dimethyl phthalate, about 30% to 40%;

hexylene glycol, about 10% to 20%; and water, not more than about 10%.

8. A safe aqueous solution of a lower ketone peroxide consisting of, in weight percent of composition:

methyl ethyl ketone peroxides, sufficient to afford about 7.25% to 11% active oxygen content of said composition;

hexylene glycol, about 18% to 24%;

N-methyl-2-pyrrolidone, about 4% to 10%; and the balance water.

9. A safe alicyclic ketone peroxide composition consisting essentially of, in weight percent of composition:
(a) ketone peroxide derived from unsubstituted alicyclic ketone having 3 to 6 carbon atoms in the ring, sufficient to afford about 11.0% to 16.5% active oxygen content of said composition;
(b) about 10% to 25%, of at least one member selected from the group consisting of: alkylene glycols, ethylene glycol monoalkyl ethers, diethylene glycol monoalkyl ethers, cyclic ether substituted alcohols, and mixtures thereof;
(c) not more than 10% of water and; not more than about 25% of an amide selected from the class consisting of 2-pyrrolidone and N-methyl-2-pyrrolidone.

10. A safe acyclic ketone peroxide composition of improved thermal stability consisting essentially of, in weight percent composition:
(a) unsubstituted acyclic ketone peroxide, sufficient to afford about 7.25% to 12.5% active oxygen content of said composition;
(b) an amide selected from the class consisting of 2-pyrrolidone and N-methyl-2-pyrrolidone, about 4% to 20%;
(c) about 10% to 24% of at least one member selected from the group consisting of alkylene glycols, ethylene glycol monoalkyl ethers, diethylene glycol monoalkyl ethers and cyclic ether substituted alcohols;
(d) nonyl phenyl ether of polyethylene glycol, about 5% to 40%; and
(e) water, about 5% to 30%.

References Cited

UNITED STATES PATENTS

| | | | |
|---|---|---|---|
| 3,015,631 | 1/1962 | McCloskey | 260—610 |
| 3,103,411 | 9/1963 | Fuchs | 23—2 |
| 3,141,745 | 7/1964 | Caluino | 44—62 |

OTHER REFERENCES

Milas et al.: "J. Amer. Chem. Soc.," vol. 81 (1959), pp. 3361–64.

LEON ZITVER, *Primary Examiner*.

W. B. LONE, *Assistant Examiner*.